United States Patent [19]

Kanehira et al.

[11] Patent Number: 5,143,477
[45] Date of Patent: Sep. 1, 1992

[54] SHAFT CONNECTING STRUCTURE

[75] Inventors: Makoto Kanehira, Hirakata; Toshio Takahashi, Toyonaka; Takerou Nakagawa, Osaka, all of Japan

[73] Assignee: Tsubakimoto Chain Co., Osaka, Japan

[21] Appl. No.: 738,161

[22] Filed: Jul. 30, 1991

[30] Foreign Application Priority Data

Aug. 1, 1990 [JP] Japan ................... 2-81107

[51] Int. Cl.⁵ ............................................... F16B 1/00
[52] U.S. Cl. ................... 403/341; 403/393; 403/404
[58] Field of Search ............... 403/341, 393, 340, 339, 403/334, 364, 300, 314, 30, 28, 404, 286

[56] References Cited

U.S. PATENT DOCUMENTS

| 650,412 | 5/1900 | McCellan | 403/340 |
|---|---|---|---|
| 904,210 | 11/1908 | Minard | 403/314 |
| 1,438,751 | 12/1922 | Des Isles | 403/300 X |
| 2,470,282 | 5/1949 | Baker et al. | 403/340 X |
| 4,376,592 | 3/1983 | Martinek | 403/341 X |
| 4,391,547 | 7/1983 | Jackson, Jr. et al. | 403/286 X |
| 4,416,563 | 11/1983 | Zemke et al. | 403/341 X |
| 5,098,216 | 3/1992 | Caperton | 403/393 X |

FOREIGN PATENT DOCUMENTS 2033697 1/1972 Fed. Rep. of Germany ...... 403/341

Primary Examiner—Peter M. Cuomo
Attorney, Agent, or Firm—Howson & Howson

[57] ABSTRACT

In a shaft connecting structure, particularly suitable for fragile or brittle shafts of ceramic materials, used in high temperature environments such as conveyors in sintering furnaces, two shafts are connected in end-to-end driving relationship. Each shaft has one or more axial sector-sectional projections and sector-sectional grooves alternately formed at its end. The sector-sectional projections of each shaft enter the sector-sectional grooves of the other shaft, and the assembly of projections and grooves is clearance-fit in a cylindrical opening of a body which may be carried by the shafts or fixed to another structure.

3 Claims, 5 Drawing Sheets

SHAFT CONNECTING STRUCTURE

BRIEF SUMMARY OF THE INVENTION

This invention relates to shaft connecting structures, and in particular to a structure for connecting rotating shafts in driving relationship. The invention has particular utility in providing connections between shafts made of fragile or brittle materials, for example ceramic materials. Such shafts are used, for example, in conveyors in sintering furnaces and in conveyors exposed to corrosive materials such as strong acids and alkalis.

In conventional shaft-connecting structures for connecting a pair of shafts in end-to-end, coaxial, driving relationship, each shaft has a flange at its end, secured against rotation relative to its shaft by a key fitting into keyways machined in the shaft and in the center opening of the flange. The flanges of the respective shafts are then bolted together. Fitting of requires precision machining. This type of connecting structure is unsuitable to shafts made of a fragile or brittle material such as ceramic. When fragile or brittle shafts are connected together, keyless tapered rings have been used. However, keyless, tapered rings are not suitable for use at the high temperatures encountered in sintering furnaces or in corrosive environments.

The principle objects of this invention are: to provide a shaft connecting structure which permits shafts of fragile or brittle materials to be connected together in coaxial, end-to-end, driving relationship; to avoid the problems associated with keyways, tapered rings and the like; and to provide a connecting structure which is capable of withstanding the effects of high temperatures and corrosive environments.

In accordance with the invention, a pair of shafts, arranged in end-to-end coaxial relationship to form a continuous shaft structure, are connected together in driving relationship by a shaft connecting structure in which each of the shafts has at least one element projecting axially therefrom and having a sector-shaped transverse cross-section, in which each shaft also has an axially extending, sector-shaped groove which receives and mates with each axially projecting sector-shaped element of the other shaft. A sleeve, having a cylindrical opening, surrounds the portion of the shaft structure along which the projecting elements and grooves extend, and that portion of the shaft structure fits in the cylindrical opening of the sleeve with a clearance fit.

The shafts are inserted into opposite ends of the cylindrical opening of the sleeve so that the sector-shaped projections slide into the sector-shaped grooves. The projections are held in mating relationship with the grooves by the sleeve so that transmission of torque from one shaft to the other is possible.

Further objects, advantages and details of the invention will be apparent from the following detailed description, when read in conjunction with the drawings.

DETAILED DESCRIPTION

Figure 7:
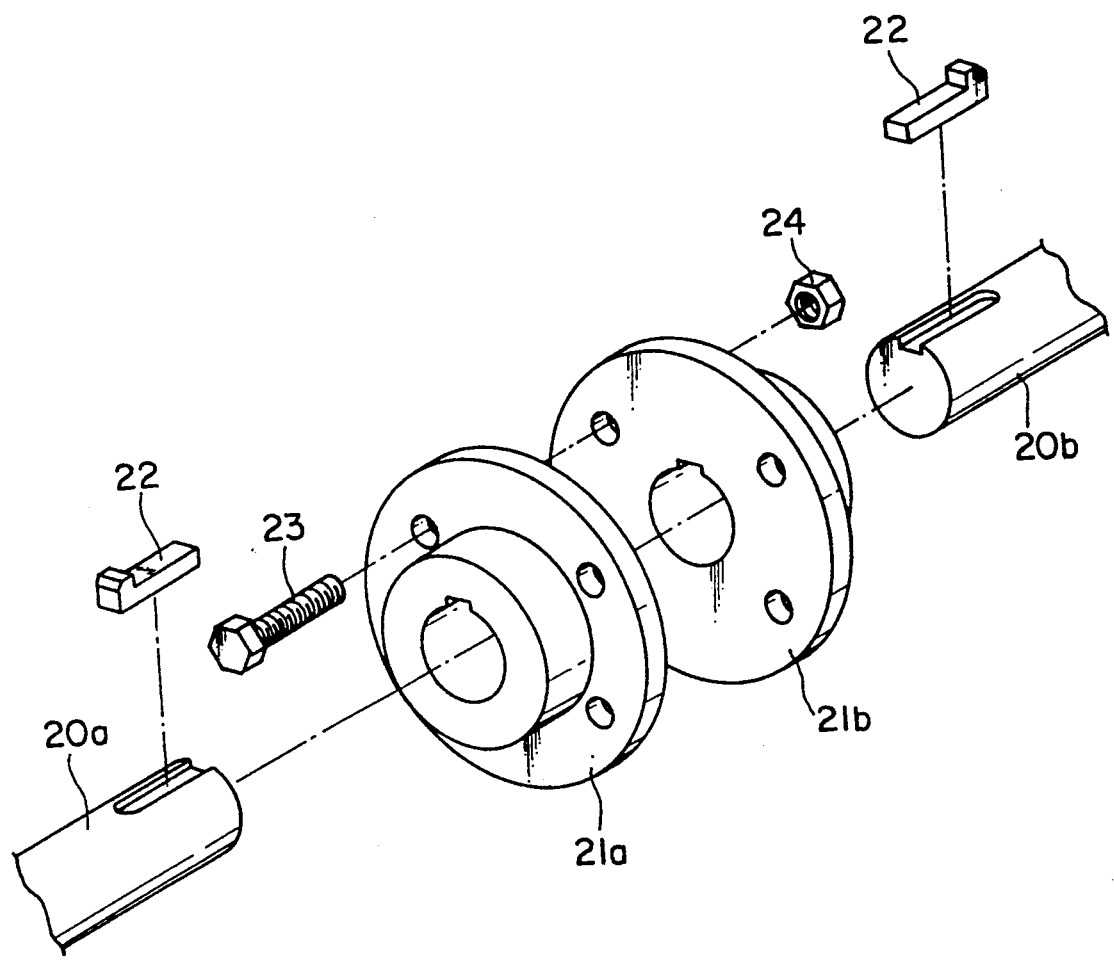
FIG. 7 is a fragmentary exploded perspective view of a conventional shaft connecting structure in accordance with the prior art.

The conventional shaft connecting structure in accordance with the prior art, as shown in FIG. 7, comprises a pair of shafts 20a and 20b arranged in end-to-end, coaxial relationship. Flanges 21a and 21b are held against rotation on the ends of the respective shafts by means of keys 22, which fit into keyways machined in the shafts and in the central openings of the flanges. The flanges are secured to each other by bolts and nuts exemplified by bolt 23 and nut 24. As mentioned previously, fitting of the flanges to the shafts and forming the keyways requires precision machining, which is not easy to carry out on fragile or brittle material such as ceramic. Furthermore, key and slot connections are not suitable for connection of flanges to shafts made of brittle or fragile materials such as ceramics.

Figure 1:
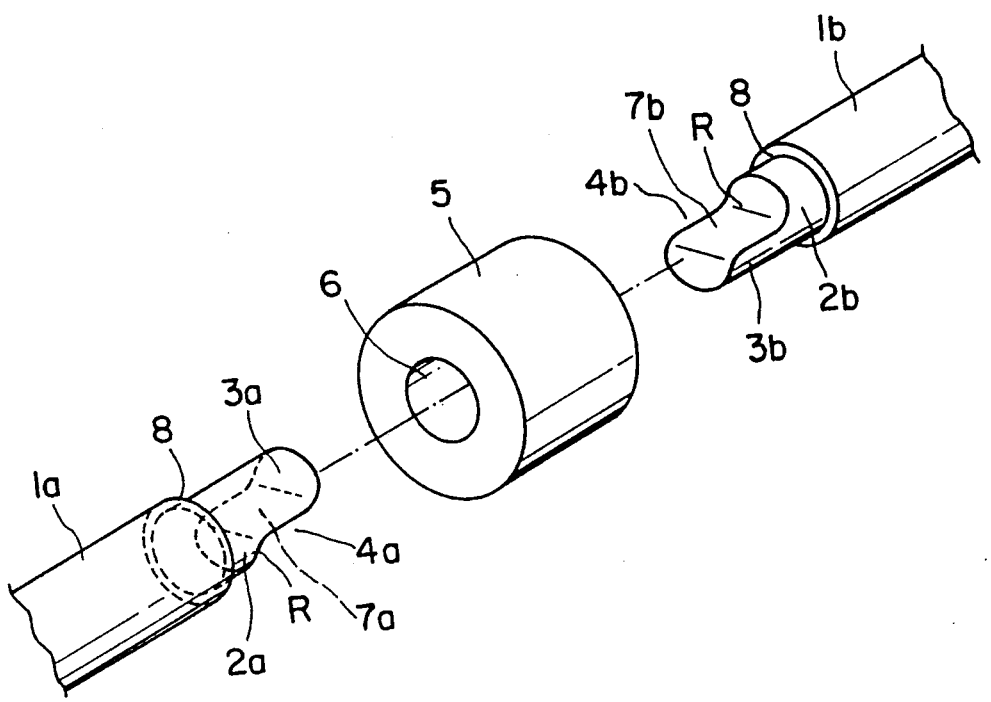
FIG. 1 is a fragmentary exploded perspective view of a first embodiment of the invention wherein each shaft has a single 180° sector-shaped projection and a single 180° sector-shaped groove.

In the embodiment of the invention shown in FIG. 1, the mutually facing ends of shafts 1a and 1b have reduced end portions 2a and 2b respectively. These end portions are each cut on an axial plane to provide projections 3a and 3b, which have semi-circular cross-sections. That is, the cross-sectional shape of each projection is in the form of a 180° sector. The cut-away parts of end portions 2a and 2b provide 180° sector-shaped grooves 4a and 4b, which have cross-sectional areas substantially equal to the cross-sectional areas of the projections. A rounded portion R is formed at the root of each projection, and the ends of the projections are also rounded, where the end faces of the projections meet diametral surfaces 7a and 7b, so that the rounded ends conform to rounded portions R.

A cylindrical sleeve 5, has a circular, cylindrical through hole 6 adapted to receive the reduced portions 2a and 2b of the shafts in its opposite ends. The reduced portions fit into hole 6 with a clearance fit. When the reduced portions extend into opposite ends of hole 6, projections 3a and 3b overlap each other, that is, projection 3a fits into groove 4b and projection 3b fits into groove 4a. Surfaces 7a and 7b engage each other, preventing the shafts from rotating relative to each other. Thus, when one shaft rotates, the other shaft rotates with it so that torque can be transmitted from one shaft to the other. Sleeve 5 prevents the projections from separating from each other as a result of the repulsion forces acting between engaging diametral surfaces 7a and 7b when the shafts rotate. Thus, sleeve 5 prevents the projections from being damaged.

In FIG. 1, sleeve 5 is supported by projections 3a and 3b, and axial movement of sleeve 5 is impeded by shoulders 8, at the roots of the reduced portions 2a and 2b.

Since the sleeve is carried by the shafts, it can accommodate lateral movement of the shafts.

Projections 3a and 3b have no points at which stress is concentrated. Therefore, they can be made of fragile or brittle material, such as ceramic material.

Figure 1A:
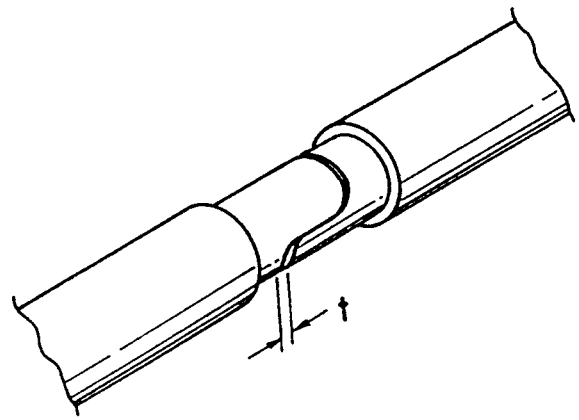
FIG. 1a is a perspective view showing the shafts of FIG. 1 in engagement with each other, the sleeve being removed so that the relationship between the shaft ends is visible.

As shown in FIG. 1a, an axial gap t can be provided between the tip of each projection and the opposing end of the mating groove of the opposite shaft. This gap accommodates thermal expansion, which is important where the shaft connection is used in a high-temperature environment, for example in a conveyor in a sintering furnace.

Figure 2:
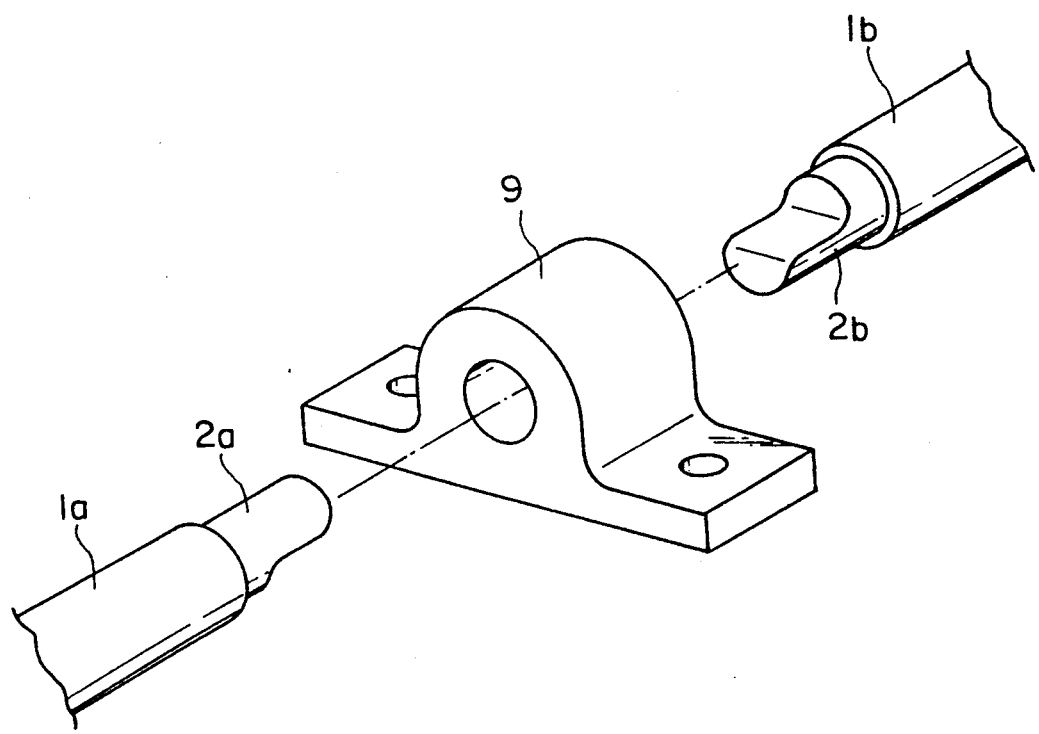
FIG. 2 is an exploded perspective view of a second embodiment in which the sleeve is in the form of a pillow block.

FIG. 2 illustrates an embodiment of the invention which is similar to that of FIG. 1 except that the sleeve is in the form of a pillow block 9, which can be secured in a fixed position by bolts (not shown) through its flanges. The pillow block provides additional support for the shaft assembly, and is suitable for use where there is no need for lateral movement of shafts 1a and 1b.

Figure 3:
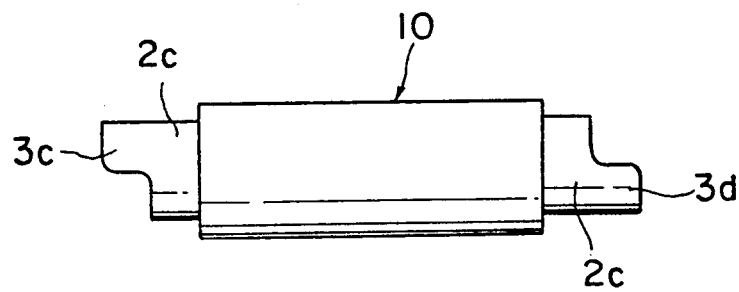
FIG. 3 is a side elevation of an intermediate shaft constructed in accordance with the invention.
Figure 4:
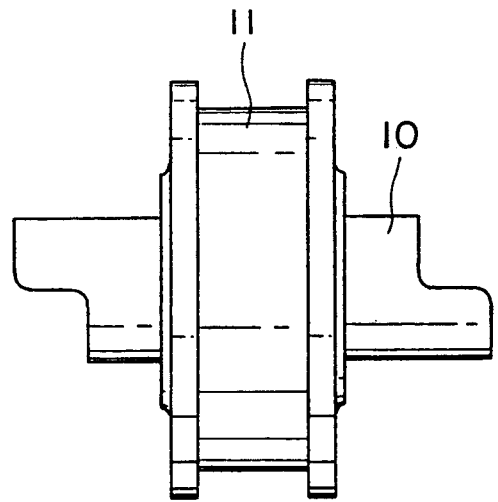
FIG. 4 is a side elevation of an assembly comprising an intermediate shaft and a pulley.

The shaft connecting structure of the invention can take many forms. For example, FIG. 3 shows an intermediate shaft 10 having reduced portions 2c at its opposite ends, having semicircular projections 3c and 3d respectively. Thus, at each end of the intermediate shaft, there is provided a 180° segment-shaped projection and a 180° segment-shaped groove. This intermediate shaft can be used to provide a torque-transmitting connection between two rotating elements. FIG. 4 shows a similar intermediate shaft 10 having semicircular projections at both ends, and having an integrally formed pulley 11. This assembly can be used to transmit power between a belt (not shown) in contact with the pulley and elements engaged with the ends of the shaft.

Figure 5:
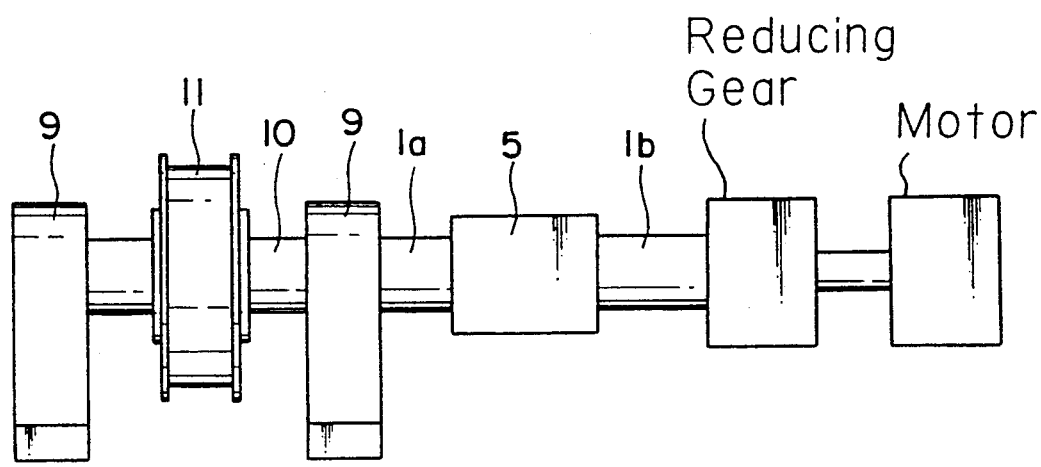
FIG. 5 is a partially diagrammatic side elevation of a mechanism utilizing a shaft connecting structure in accordance with the invention.

FIG. 5 shows a typical assembly in which a motor drives a shaft 1b through a reducing gear. Shaft 1b (which corresponds to shaft 1b in FIG. 1 is connected to a shaft 1a through a sleeve 5. The connection within sleeve 5 is as shown in FIGS. 1 and 2. Shaft 1a is connected, in turn, to shaft 10 within a first pillow block 9 in the manner similar to what is shown in FIG. 2. Shaft 10 corresponds to shaft 10 in FIG. 4, and has an integrally formed pulley 11. The opposite end of shaft 10 is journalled in a second pillow block 9.

Figure 6A:
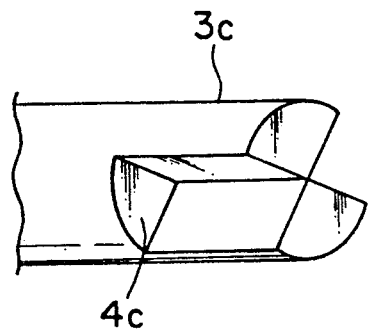
FIG. 6a is a perspective view of a shaft end in which the sector and groove angles are 90°.
Figure 6B:
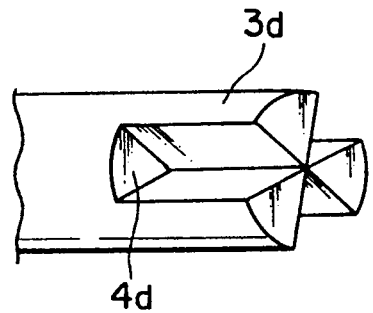
FIG. 6b is a perspective view of a shaft end in which the sector and groove angles are 60°.

While the projections and grooves are preferably in the form of 180° segments, it is possible to construct the projections and grooves in other configurations such as those shown in FIGS. 6a and 6b.

In FIG. 6a, the shaft is provided with two opposed 90° projections 3c and two opposed 90° grooves 4c. The mating shaft (not shown) is similar, but has a central axially extending slot permitting entry of the central portions of the projections of the shaft of FIG. 6a.

In FIG. 6b, the shaft is provided with three projections in the form of 60° segments 3d spaced circumferentially by three 60° segment-shaped grooves 4d. Here again, the mating shaft (not shown) is similarly configured but centrally slotted so that the two shafts can engage each other.

The shaft connecting structure in accordance with the invention eliminates the need for precision machining of keyways, and is far less susceptible to breakage than key connections in fragile or brittle shaft materials.

It has a resistance to failure from fatigue, and it can easily be made to accommodate thermal expansion so that the shaft connection can be used in a high temperature furnace. With the invention, it is also a simple matter to accommodate connected shafts having different coefficients of thermal expansion. Particularly in the case of projections and grooves in the form of 180° segments, the shaft connections are easy to form, e.g. by machining, grinding, by casting, or by a combination of procedures, and high accuracy is not required to fabricate a practical shaft connection.

Various modifications can be made to the shaft connecting structures described above. For example, surfaces 7a and 7b in FIG. 1 need not lie in axial planes. They can be in planes oblique to the common axis of the shafts, or can even be in the form of complementary curves. Although it is preferable to make the ends of the mating shafts identical to each other for convenience in fabrication and maximum strength, this is not necessarily the case. For example, in a given connection, the projection of one shaft can be in the form of a segment exceeding 180° while the projection in the mating shaft can be in the form of a segment less than 180°. While the mating projections preferably form a complete cylinder conforming to the cylindrical inner wall of the sleeve, this is not necessarily the case. Gaps in the circumference of the portion of the mating elements within the sleeve can exist, so long as a positive driving relationship is maintained between the shafts. The sleeve can rotate with the shafts or can be fixed so that the shaft projections rotate within it. FIGS. 6a and 6b can be used. Still other modifications can be made to the shaft connection structure described herein without departing from the scope of the invention as defined in the following claims.

We claim:

1. In a driving mechanism comprising a pair of shafts arranged in end-to-end coaxial relationship to form a continuous shaft structure, a shaft connecting structure in which each of said shafts has at least one element projecting axially therefrom, said shaft element having a sector-shaped transverse cross-section, in which each shaft also has an axially extending, sector-shaped groove receiving and mating with each axially projecting sector-shaped element of the other shaft, in which said projecting elements and grooves extend along a portion of said shaft structure, and including means providing a sleeve having a cylindrical opening, said sleeve surrounding said portion of the shaft structure, said portion of the shaft structure fitting in said cylindrical opening of the sleeve with a clearance fit, and said elements being radially reduced with respect to the shafts from which they project, whereby a shoulder is formed on each shaft, the shoulders on the shafts being engageable with said sleeve and thereby impeding axial movement thereof.

2. The shaft connecting structure according to claim 1 wherein at least one of the portions of said shafts within said sleeve is made of a fragile or brittle material.

3. The shaft connecting structure according to claim 2 in which said fragile or brittle material is a ceramic material.

* * * * *